Feb. 23, 1926.
W. H. SERGENT
CARAMEL WRAPPING MACHINE
Filed Jan. 9, 1922
1,574,120
12 Sheets-Sheet 1
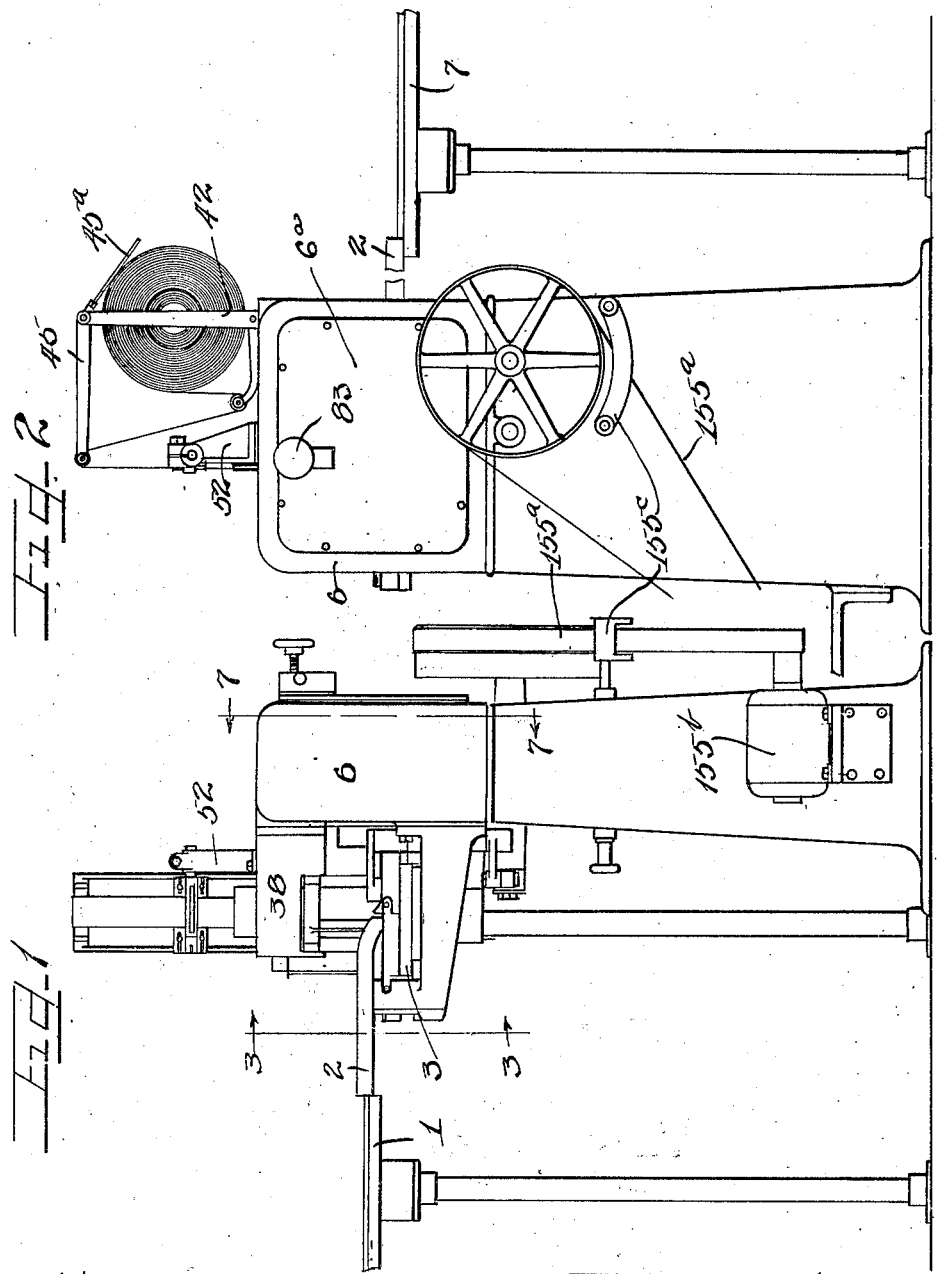

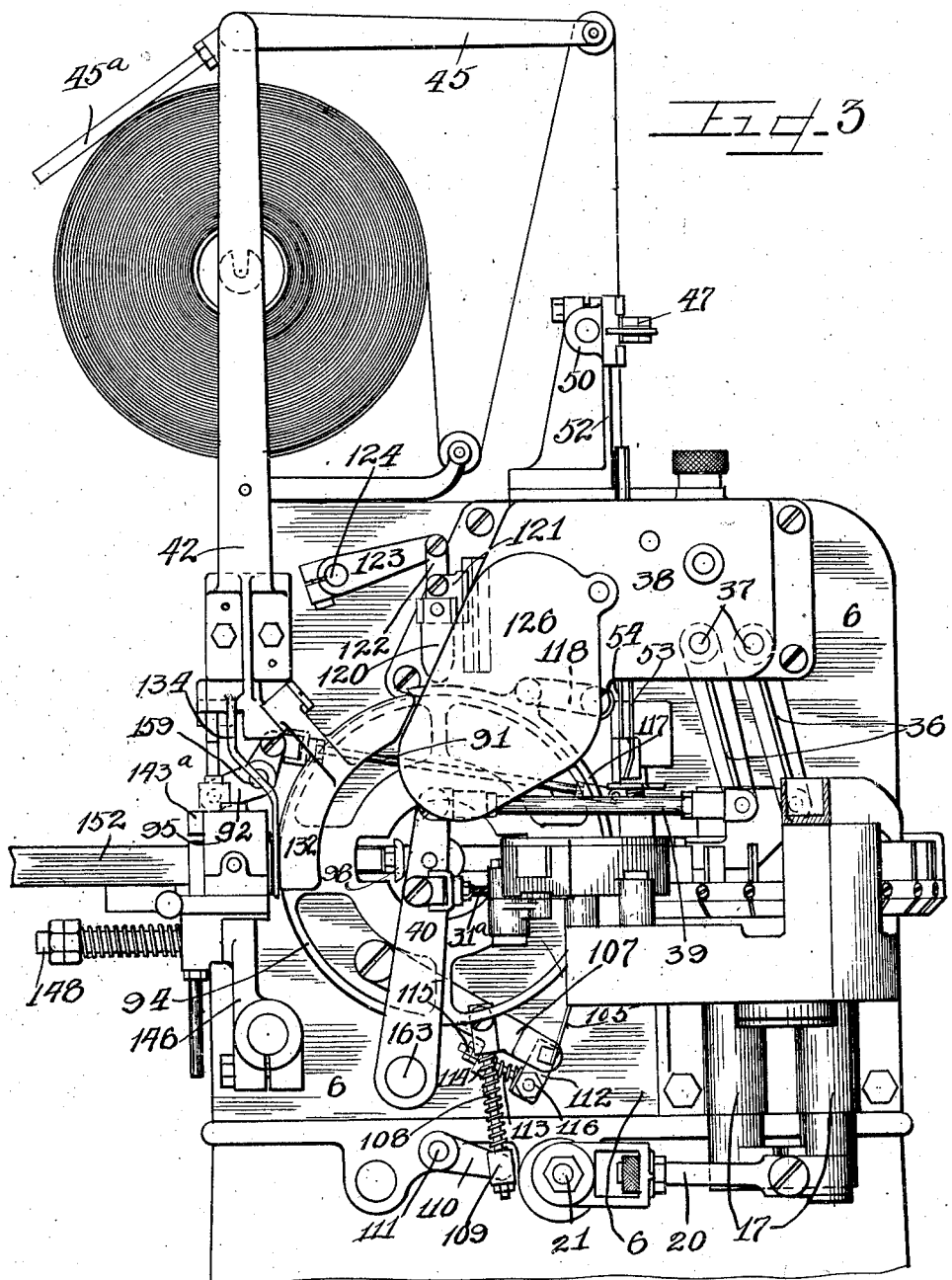

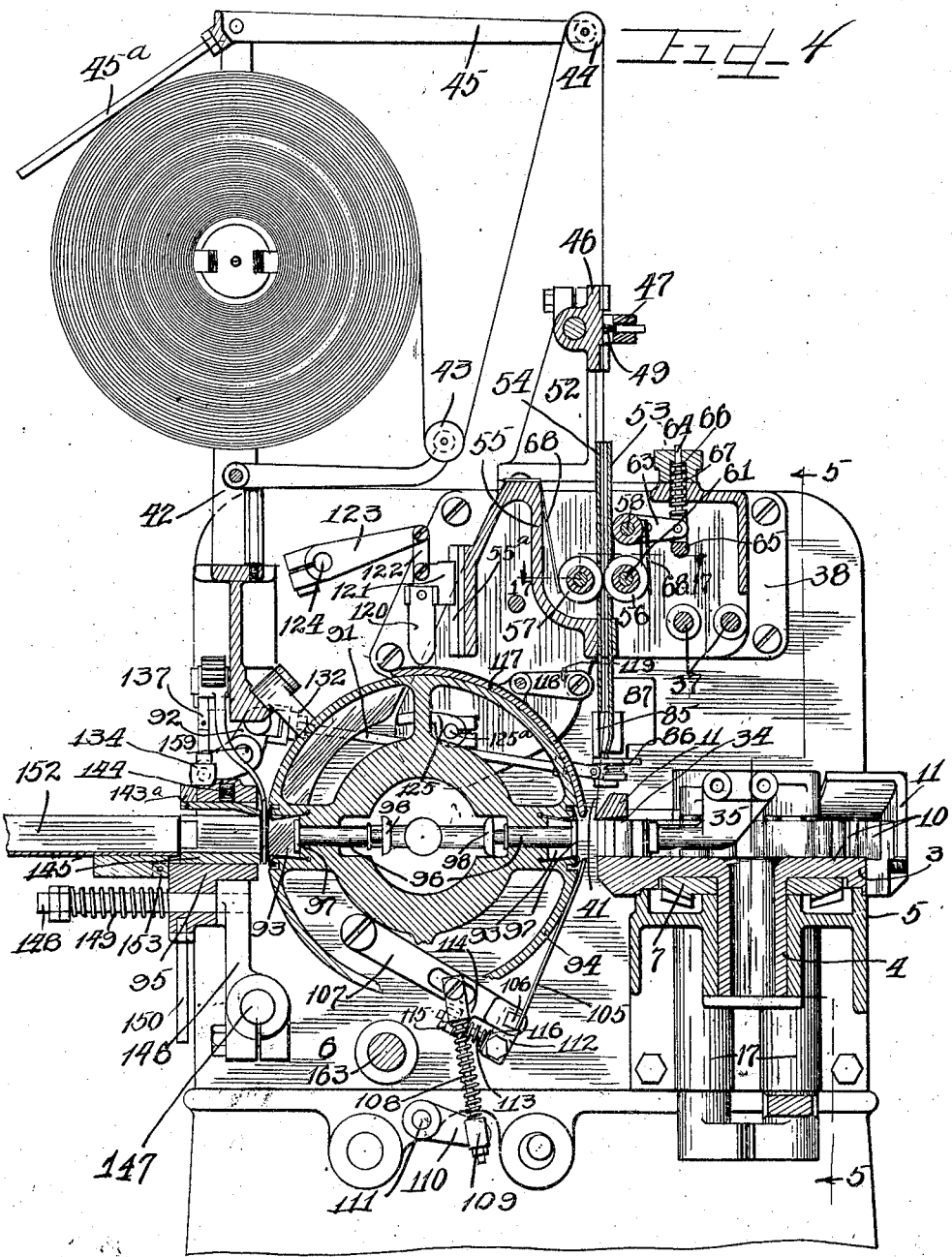

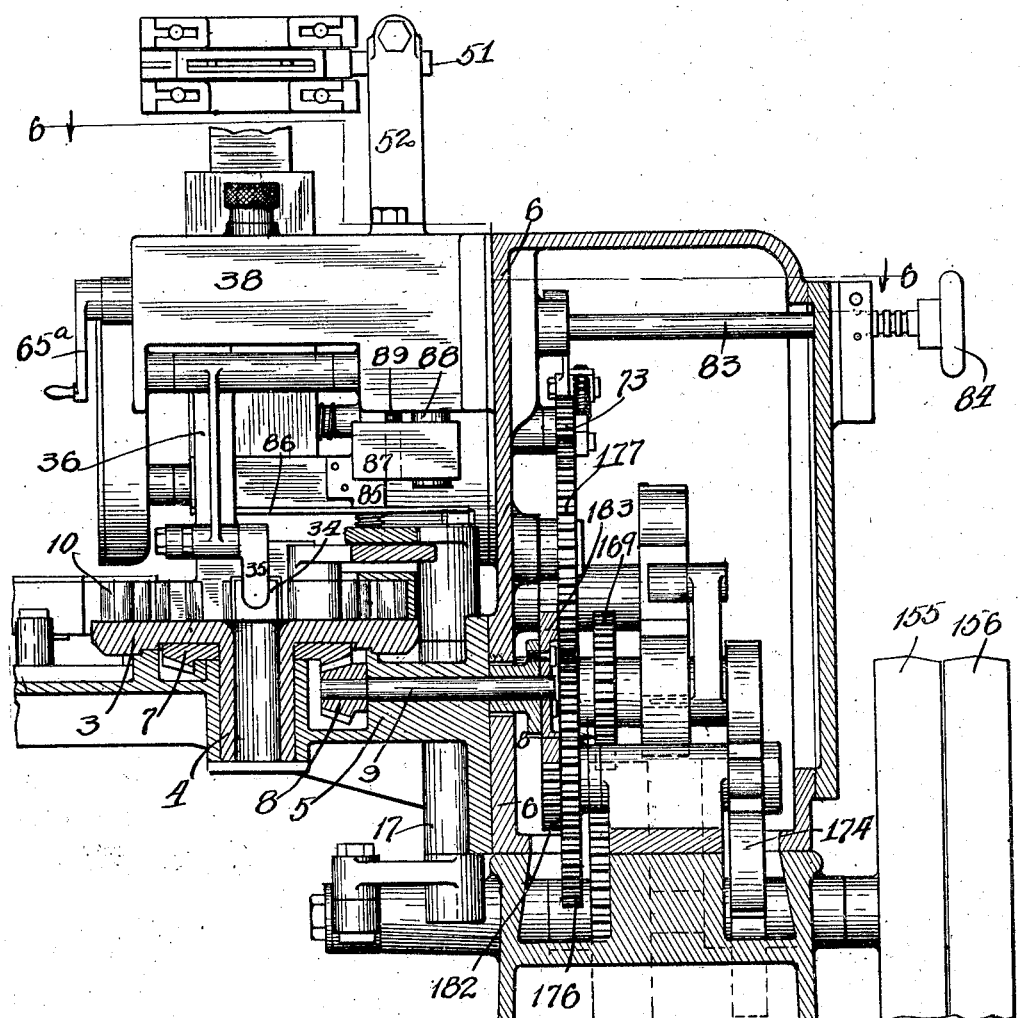

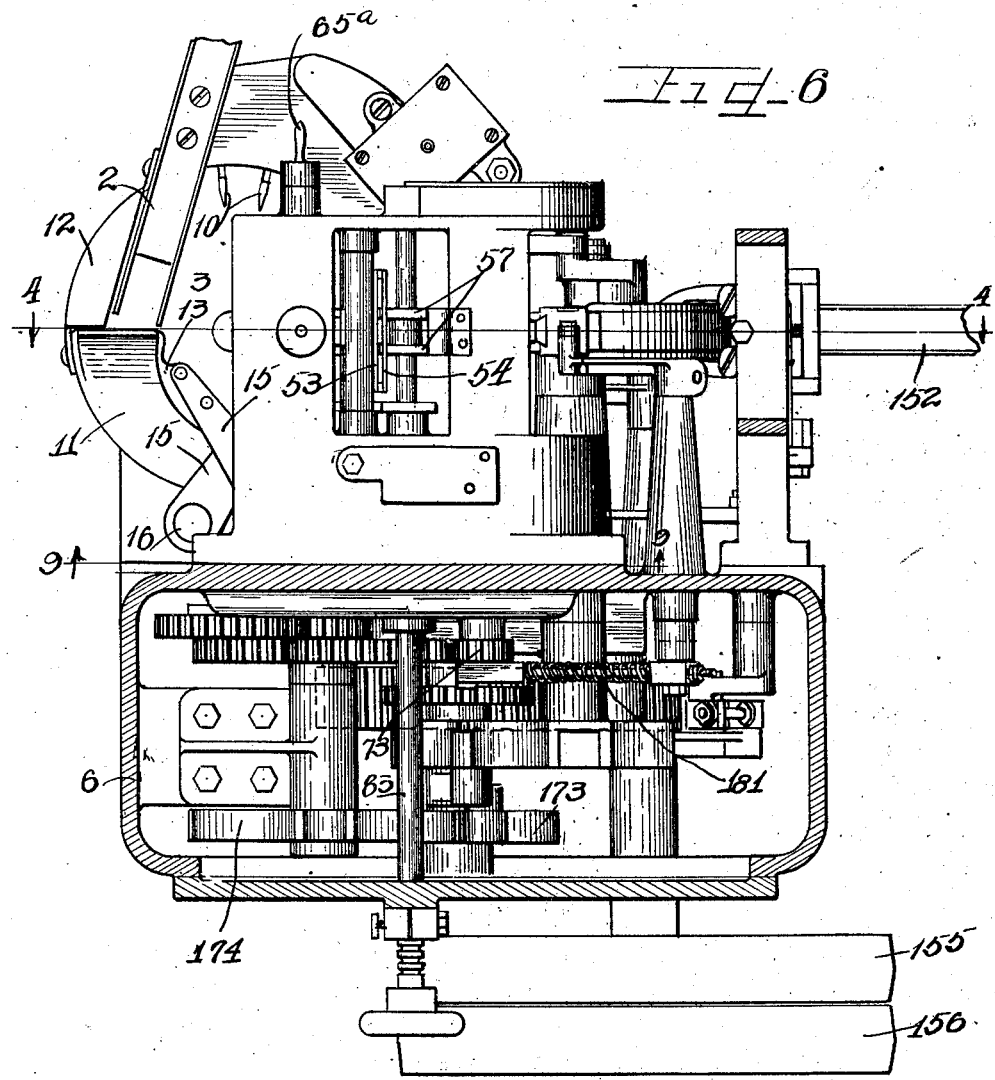

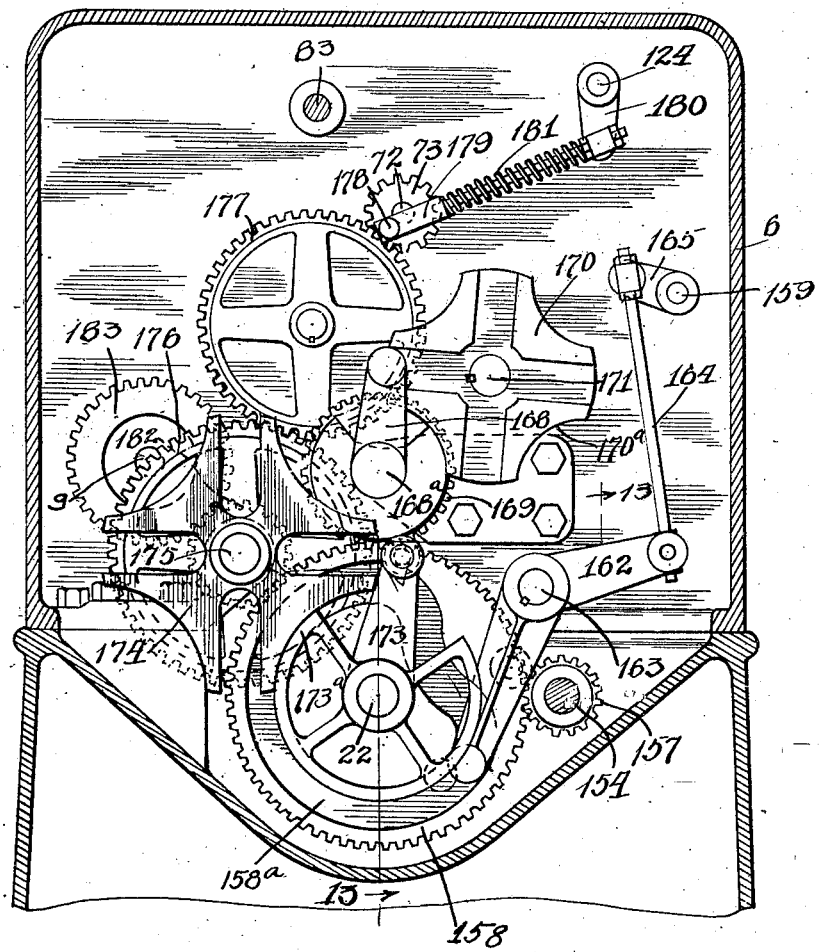

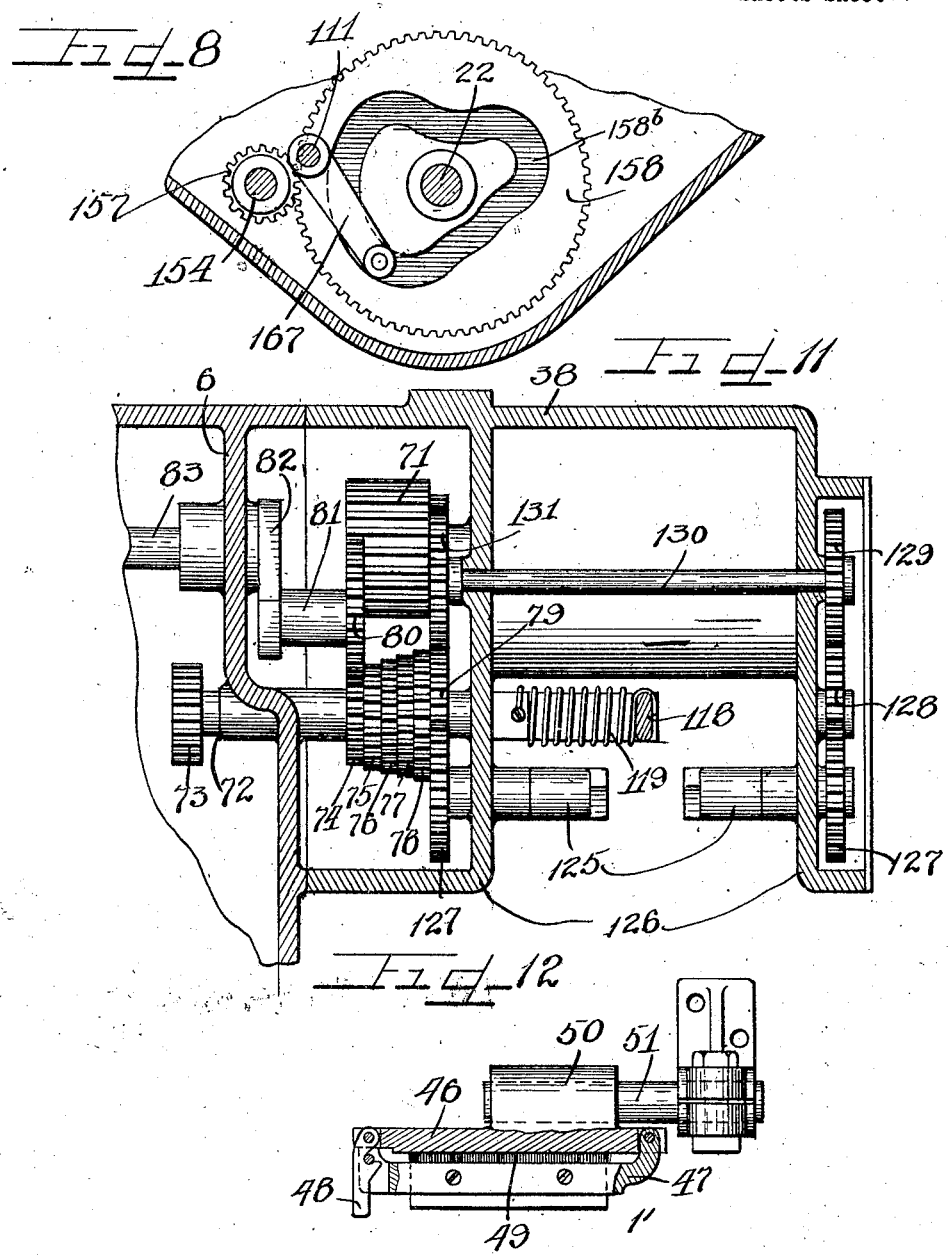

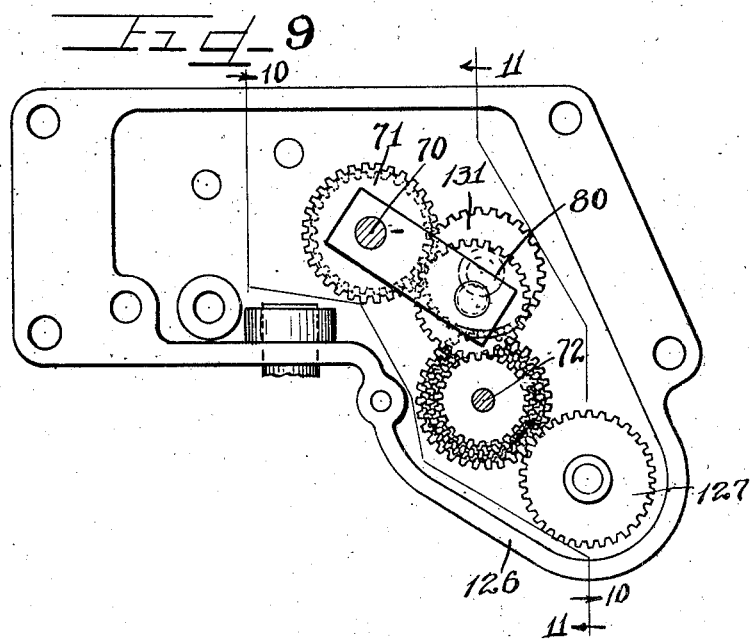
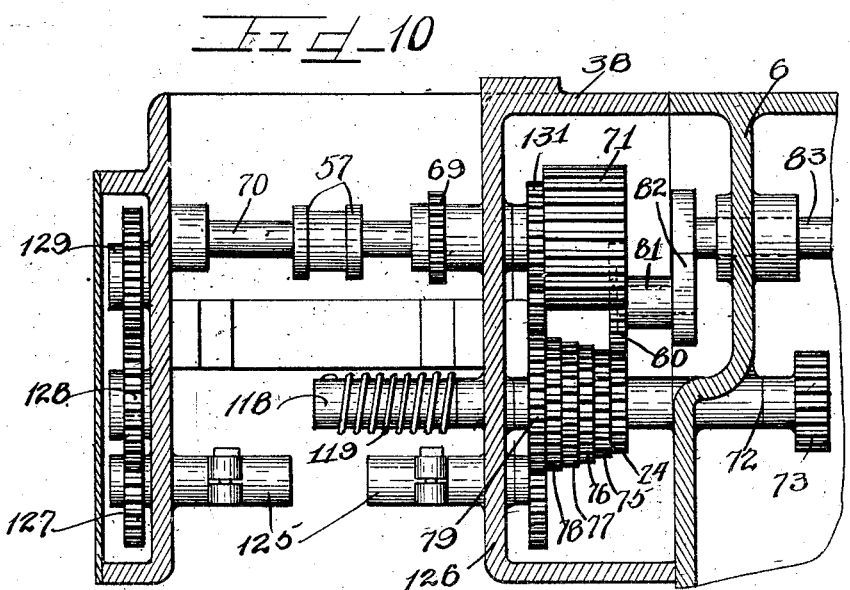

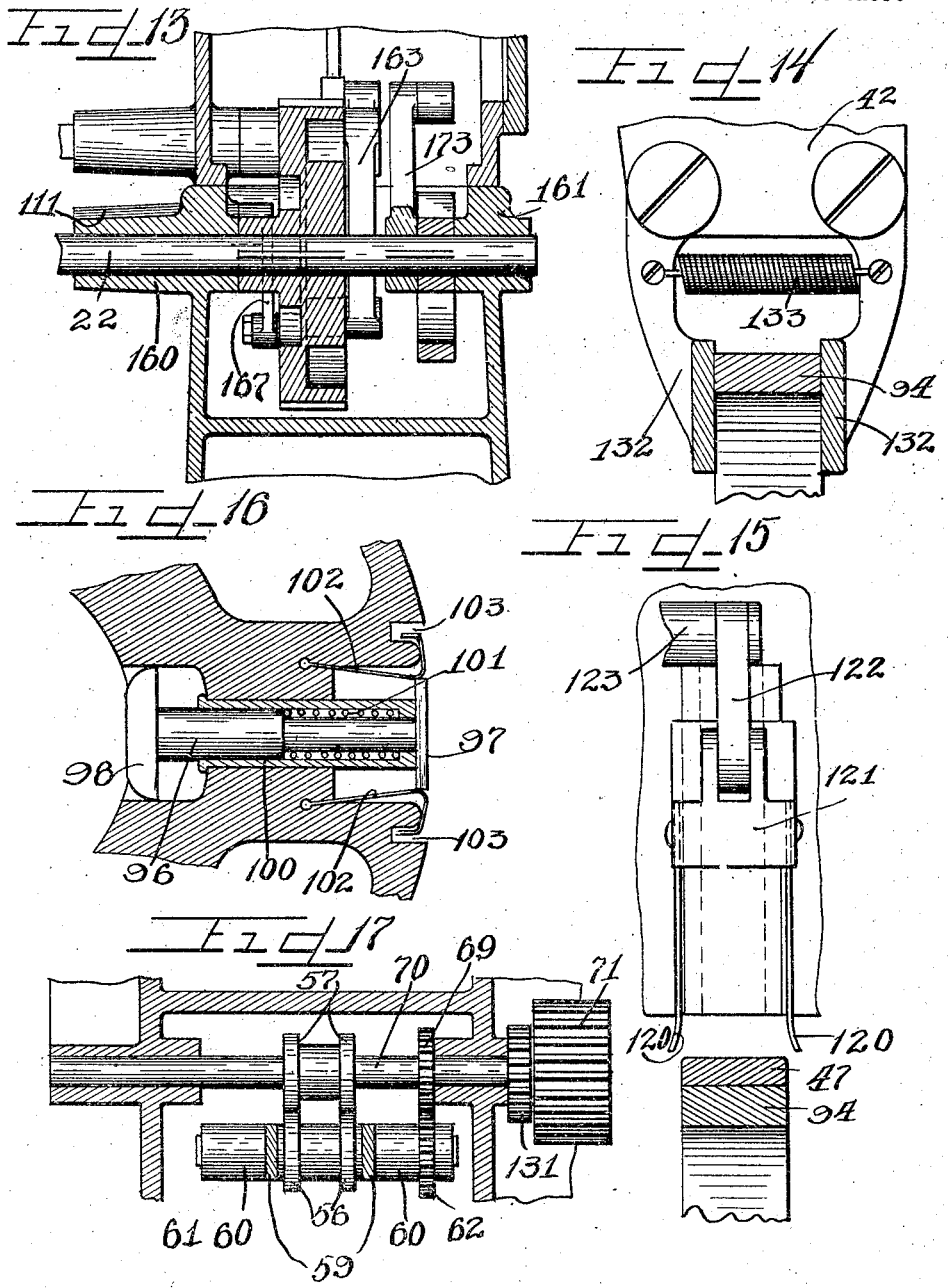

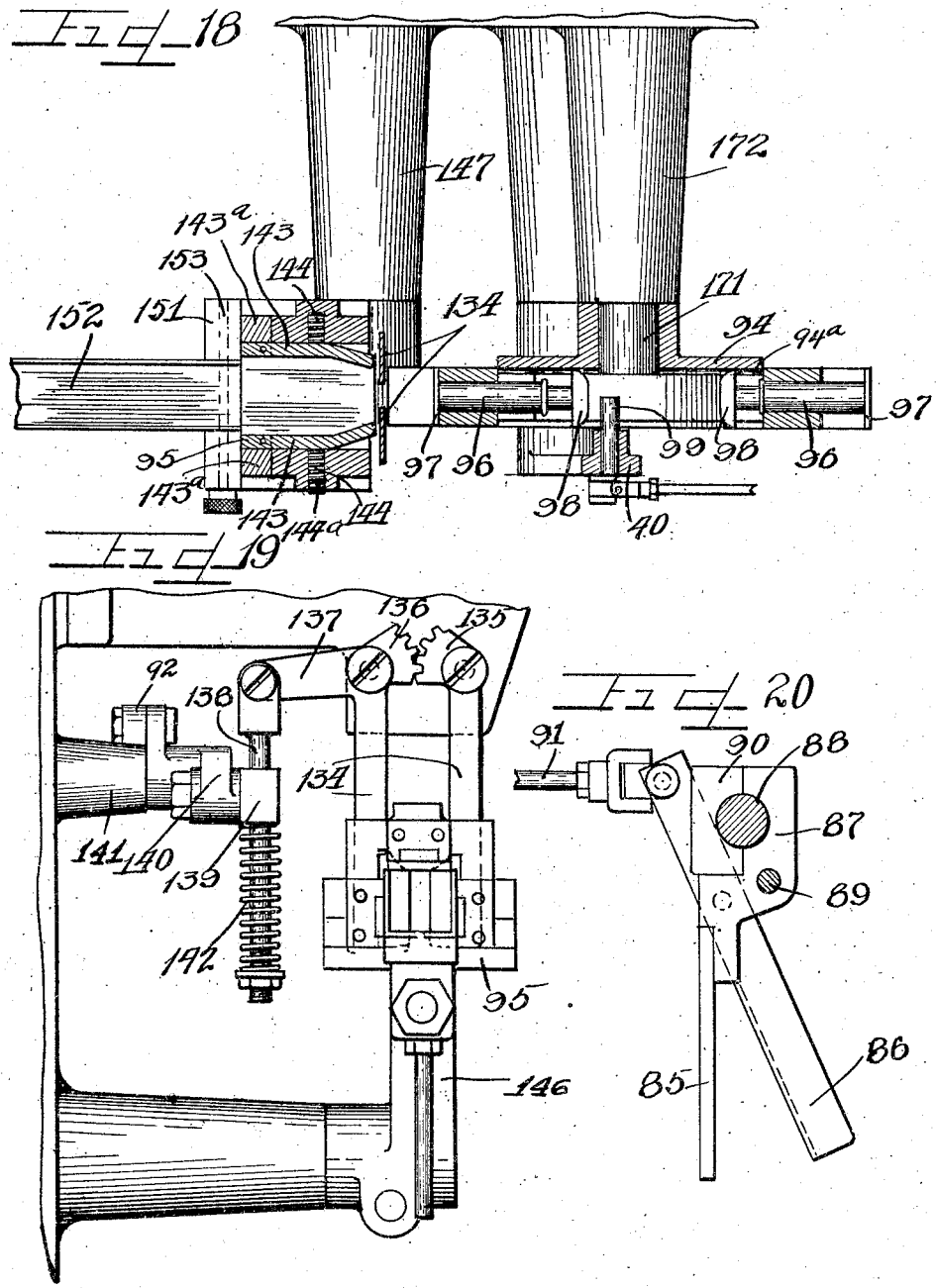

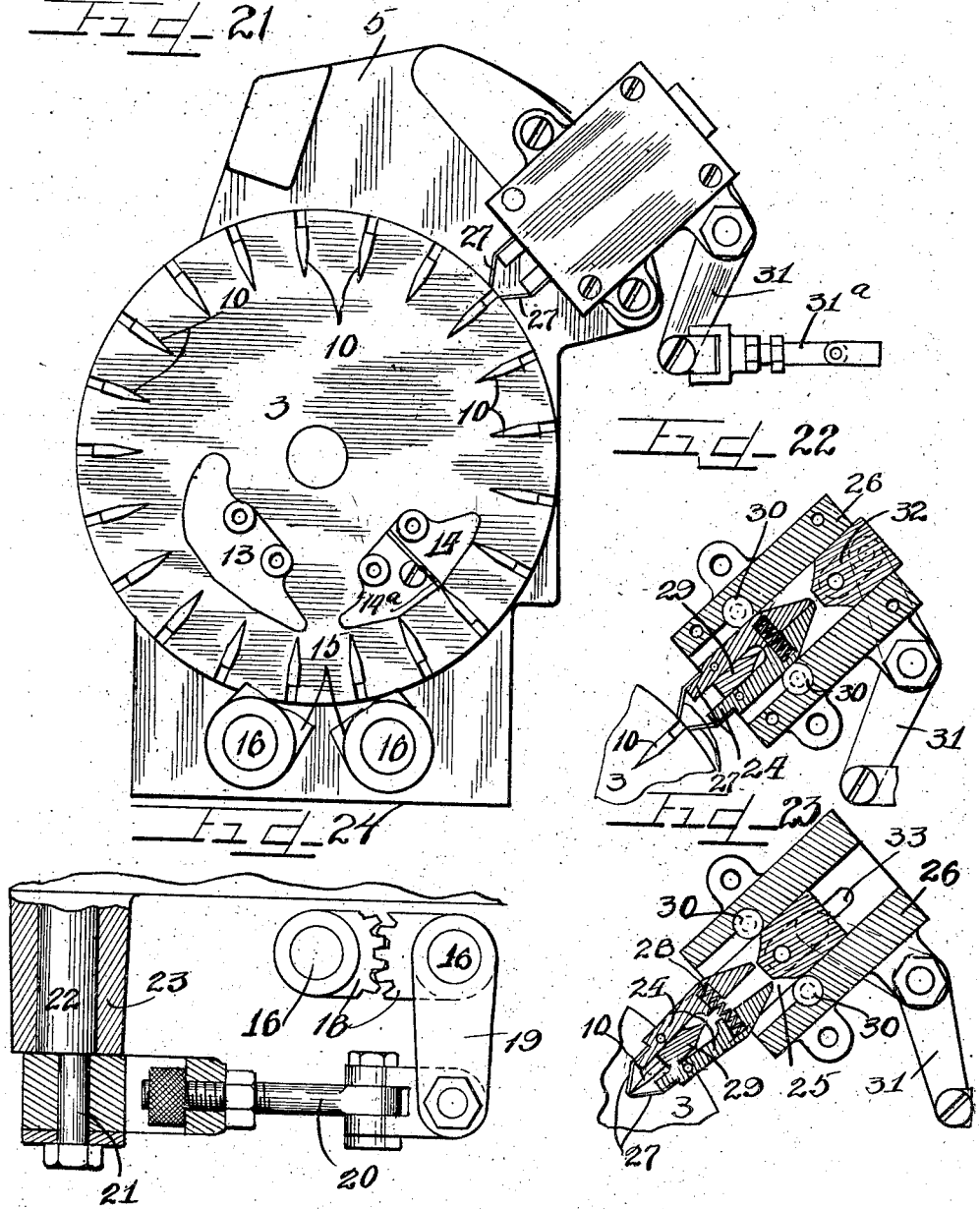

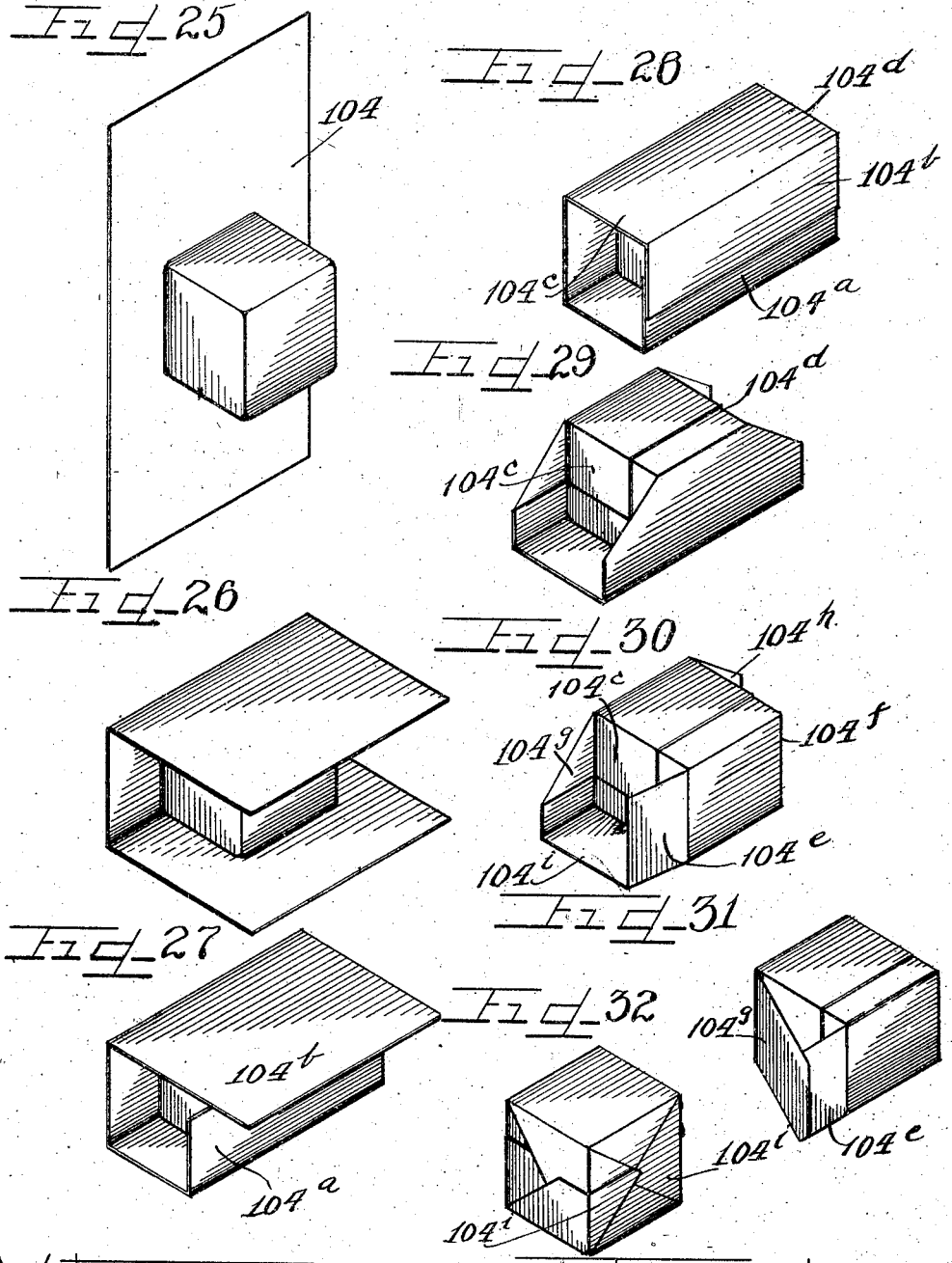

Patented Feb. 23, 1926.

1,574,120

UNITED STATES PATENT OFFICE.

WALTER H. SERGENT, OF MIDDLETOWN, NEW YORK, ASSIGNOR TO IDEAL WRAPPING MACHINE COMPANY, A CORPORATION OF NEW YORK.

CARAMEL-WRAPPING MACHINE.

Application filed January 9, 1922. Serial No. 527,828.

*To all whom it may concern:*

Be it known that I, WALTER H. SERGENT, a citizen of the United States, and a resident of the city of Middletown, in the county of Orange and State of New York, have invented certain new and useful Improvements in a Caramel-Wrapping Machine; and I do hereby declare that the following is a full, clear, and exact description of the same, reference being had to the accompanying drawings, and to the numerals of reference marked thereon, which form a part of this specification.

This invention relates to a caramel or candy wrapping and forming machine in which the dough or bulk is fed to a rotary forming and cutter box from which the formed pieces of candy are projected to a wrapping wheel.

It is an object of this invention to generally improve and simplify the construction and operation of such machines.

It is a further object of this invention to provide an inclosed lubricant containing casing or chamber for containing all the main transmission mechanism intergeared in compact form and having parallel shafts extending through the rear wall of said chamber and directly connected to the operated mechanisms supported on the rear wall. It is broadly an object of this invention to construct a compact machine occupying but little space.

It is a further object of this invention to provide an improved discharge box.

With these and other objects in view, which will become more apparent in the following description and disclosures in the drawings, my invention comprises the novel features of construction and combination hereinafter described and more specifically pointed out in the appended claims.

In the drawings, which illustrate a preferred embodiment of this invention and in which a similar reference numerals refer to similar features in the different views:

Figure 1 is a side elevation of the machine embodying this invention.

Figure 2 is a front view thereof.

Figure 3 is a view taken on substantially the line 3—3 of Figure 1 looking in the direction of the arrows.

Figure 4 is a section on the line 4—4 of Figure 6.

Figure 5 is a section on the line 5—5 of Figure 4.

Figure 6 is a section on the line 6—6 of Figure 5.

Figure 7 is a section on the line 7—7 of Figure 1, showing the driving mechanism in elevation.

Figure 8 is a section on the line 8—8 of Figure 5.

Figure 9 is a view on the line 9—9 of Figure 6, showing the driving mechanism for the paper feed, with parts in elevation.

Figure 10 is a section on the line 10—10 of Figure 9.

Figure 11 is a section on the line 11—11 of Figure 9.

Figure 12 is a fragmentary view illustrating the paper brushing mechanism.

Figure 13 is a section on the line 13—13 of Figure 7.

Figure 14 is a detail view of the end folding mechanism.

Figure 15 is a perspective view of the tucker mechanism.

Figure 16 is a sectional detail of the wrapping wheel showing an ejector and carrying pocket.

Figure 17 is a section on the line 17—17 of Figure 4, showing the paper feeding mechanism.

Figure 18 is a section through the wrapping wheel and discharge chute.

Figure 19 is an elevational view of the final fold mechanism.

Figure 20 is a fragmentary view of the paper shears.

Figure 21 is a top plan view of the candy forming and cutter box.

Figures 22 and 23 illustrate the cleaning or scraping mechanism for the candy forming moulds.

Figure 24 is a plan view partly in section showing the operating connection for the presser feet.

Figures 25 to 32 illustrate the different steps and folds in wrapping the candy.

As shown on the drawings:

In the different figures of the drawing, there is illustrated one embodiment of my invention, and in order that the same may be clearly understood, I will describe the different steps in the operation of forming or moulding, cutting and wrapping a piece of candy such as a caramel, for example, and describe the different mechanisms involved in each step, and show how the different mechanisms are brought into operative timed relation with the main driving shaft.

In referring to Figure 1, there is shown a feed table 1 from which the candy dough of proper viscosity is fed through the chute 2 into the forming and cutting box 3 (see Figures 4, 5, 6 and 21).

*Forming and cutting mechanism.*

The forming box 3 comprises an intermittently rotatable disk member having a downwardly extending hub or journal 4 (Figs. 4 and 5) rotatably mounted in a socket formed in a supporting bracket 5 which is attached to the main transmission and lubricant containing casing 6 of the machine. The lower surface of the disk 3 is provided with a bevel gear 7 which meshes with a beveled pinion 8 secured on a shaft 9 journalled in the bracket 5. The shaft 9, which is termed the forming mechanism drive shaft, is connected to the main drive and intermittently rotated thereby, as will be explained hereinafter. The upper surface of the disk 3 is provided with radially extending blades 10 (see Fig. 21) near the outer periphery. In the present instance, these blades are secured in grooves in the upper surface of the disk and are tapered toward their inner ends to provide a cutting edge. These blades are spaced apart a distance equal to the length of the piece of candy desired and are spaced a short distance from the outer periphery of the disk to provide space for a guard member 11 (Fig. 4) which encircles the disk 3 and forms in connection therewith a mould or forming box, and to prevent the candy dough from escape as it is fed from the chute 2 (see Fig. 6) and to direct the same under the guard 11, an additional guard 12 is preferably secured to the guard 11 and chute 2 to protect the operators' fingers.

As the plastic candy is fed upon the cutting disk 3 and passes under the guard 11, or in other words as it is fed into the forming box, it is first acted upon by a presser foot 13 which presses or partially presses the plastic candy between the blades 10, and as the disk 3 is rotated, the candy is acted upon by a second presser foot 14 which completely presses the plastic candy into the moulds formed by the blades 10 and guard 11, and at the same time shears the same by pressing against the cutting edges of the blades 10, as shown in Figure 21. The presser foot 14 is so constructed that it should only come in direct contact with a single blade at a time, and to preserve the cutting edge of the blades, an insert of fibre 14ª or other non-metallic substance is fixed in a specially provided groove in the presser foot so that the blades will strike the fibre. Figure 21 shows the position of the presser feet at the limits of their operative pressing strokes, and it will be noted that presser foot 13 is spaced some distance from the cutting edges of the blades, while presser foot 14 contacts a single blade at the fibre insert 14ª. The presser feet glide over the upper surface of the disk 3 and are connected for simultaneous operation. One method of accomplishing this consists in using a pair of cross arms or levers 15 and rigidly connecting the outer end of each arm to its respective presser foot (see Figs. 6 and 21); and rigidly connecting the inner end of each arm to a separate vertical operating rod or shaft 16 (see Figs. 6 and 24). The shafts 16 are preferably supported in tubular bearings 17 (see Figs. 3 and 4) secured side by side to the casing 6, the lower end of each shaft projecting beyond its bearing and being provided with a gear segment 18 (Figs. 3 and 24). The two gear segments intermesh in the form of a toggle so that the two shafts 16 are constrained to oscillate simultaneously. For the purpose of oscillating the shafts 16, a crank 19 is rigidly secured to one gear segment at one end and connected by an adjustable link mechanism 20 at its other end to a wrist pin 21 eccentrically mounted on a drive shaft 22 journalled in a bearing boss 23 on the main frame 6. The shaft 22 is continuously operated from the main driving shaft, as will be hereinafter more fully described.

In order to scrape and cleanse the cutting blades, a specially constructed wiping mechanism has been provided, as shown in Figures 21 to 23. The mechanism consists of a pair of jaw members 24 pivoted intermediate their ends upon a reciprocating block or plunger 25 slidably mounted in a guideway formed in a support 26 secured to the bracket 5. The front part of the guideway is enlarged to allow the rear ends of the jaw members to expand so that the wiping elements 27 secured to the forward end thereof may embrace the cutting blades 10, and for the purpose of thus expanding the jaw members 24, a spring 28 is suitably anchored between the rear ends of the jaw members by providing anchoring holes in the inner surfaces thereof. In order to properly space the front ends of the jaw members, a lug 29 is preferably provided upon the sliding plate 25 between the said jaw members. A pair of guide rollers 30 or the like are preferably positioned at the upper corners of the enlarged guideway and the rear ends of the jaw members are bevelled so that upon the inward movement of the reciprocating block or plunger 25, the bevelled ends will readily ride up the rollers into the restricted guideway, thus opening the jaw members against the tension of the spring 28. The slidable block 25 is periodically reciprocated by means of a bell crank lever 31 connected by a link 32 (shown in dotted lines in Figs. 22 and 23) to the sliding block 25 which is provided with a wrist pin projecting through a slot 33 in the lower wall of the guideway. It is evident that as the plunger 25 is reciprocated outwardly the wiping elements will pass on each side of the blade, and when the outward limit of movement has been reached the rear ends of the jaw members will have advanced to the enlarged guideway which will allow them to expand and press the wipers 27 together so that upon the inward movement they will scrape the blades, and when the inward movement brings the wipers to the ends of the blades 10 the bevelled ends of the elements 24 will ride up the rollers 30 into the restricted guideway to spread the wipers 27 for another operation, as is obvious. This operation will be repeated as each blade 10 comes to rest in front of the wiping mechanism. As the cutting disk rotates only the distance between two blades at each operation thereof, it is only necessary to locate the wiping mechanism in front of a blade when at rest, as each succeeding blade will come to rest at the same point. The crank 31 is connected by suitable linkage 31ª to a crank 40 (see Fig. 3) operated from the main drive.

Each intermittent rotation of the cutter disk 3 or forming box brings a formed and cut piece of candy in alinement with a discharge opening 34 in the guard 11 (see Figs. 4 and 5), which is termed the feeding aperture in respect to the wrapping wheel, the cutter disk 3 remaining momentarily at rest in such position while an ejector 35 ejects the candy. The ejector 35 is supported upon a pair of parallel links 36 (see Figs. 3 and 4) which are oscillatably supported on journals 37 secured in the under part of a casting 38 bolted or secured to the frame 6, and is intermittently operated by means of a link 39 connected to a crank 40 operated from the main drive, as will be more fully hereinafter described.

*Wrapper feeding and shearing mechanism.*

As the ejector 35 ejects the candy through the discharge or feed opening 34, the paper feeding mechanism has fed a wrapper 41 (see Fig. 4) in front of the cube or piece of candy. As shown in Figure 4, a roller of wrapping paper is rotatably supported upon a standard 42 on the frame in any approved manner, the paper being trained over the tension pulley 43 to a roller or pulley 44 supported upon an arm 45 secured to the standard 42 and having a paper brake 45ª resting upon the paper. From the roller 44, the wrapping paper passes through a guideway formed by a member 46 and a brush holding member 47 pivoted thereto at one end and secured at the other by a latch 48 (see Fig. 12) on the member 46 engaging a pin on the member 47. A brush 49 is suitably secured to or in the member 47 to brush the paper as it passes through the guideway and act as a brake to prevent its being pulled back when the paper feed is thrown out. The brush holding mechanism may be variously supported. In the present instance, it is provided with a hollow lug 50 to receive a rod 51 supported in a standard 52 (see Fig. 5) secured to the top of the casting 38. From the brush mechanism, the paper descends and enters a paper chute or guideway formed by the plates 53 and 54 which pass through an aperture in a bracket 55 on the inner side of the casting 38 and integral therewith, and extend in proximity to the discharge opening 34. The plates 53 and 54 are spaced apart by small vertical end strips to produce a closed chute (see Fig. 6). As the paper passes through the said guide, it is fed downwardly by means of the feed rolls 56 and 57 (see Figs. 4 and 17) which extend into apertures in the plates 53 and 54.

The feed rolls 56 are yieldingly suspended upon a bell crank lever arrangement rotatably supported upon a rod 58, and having a pair of downwardly extending arms 59 which carry journal bearings 60 for rotatably receiving a shaft 61 to which the rolls 56 are secured, the end of the shaft being provided with a small spur gear 62. The bell crank lever is provided with a horizontal arm 63 which is yieldingly and adjustably supported on a vertical spring pressed rod 64 (see Fig. 4), the lower end of which is adapted to be actuated for throwing out the paper feed by an adjustable abutment 65 carried by the crank 65ª which extends through the outer wall of the casting 38 (see Figs. 5 and 6) and the upper end of which extends through an aperture in the casting 38 and into a recess in a nut or cap 66 secured upon the top of the casing, the spring 67 being confined between the top of the recess in the cap 66 and an abutment on the rod to which the arm 63 is pivoted. The construction is such that the spring 67 tends to keep the rolls 56 in yielding operative relation with the paper, the bell crank being adjustable by crank 65ª to throw out the paper feed by adjusting the rolls 56 away from the paper. The rolls 56 and 57 are preferably provided with wipers 68 which are suitably supported so as to bear upon said rolls.

In order to intermittently operate the rolls 56 and 57 to supply a wrapper at the proper time and of proper length, a variable speed gearing has been provided to operate said rolls. As shown in Fig. 17, gear 62 meshes with a gear 69 secured on the shaft 70 that supports the rolls 57, the end of the shaft 70 having secured thereon a gear 71 by means of which it may be driven. Shaft 70 is rotatably supported in the bearings formed in the walls of the casing 38. Gear 71 is adapted to be driven at different speeds by means of a series of stepped gears or a gear composed of a plurality of gear circumferences of varying diameter in combination with an adjustable gear for effecting a driving relation between gear 71 and any of the different gear circumferences. As shown in Figures 9, 10 and 11, a shaft 72 is mounted in bearings in the vertical wall of the casing 6 and the bearing wall of the casing 38 for non-rotatably supporting a small spur gear 73 which is periodically operated from the main driving shaft, as will be hereinafter more fully described, and a series of different sized spur gears 74 to 78 and a gear 79 for a purpose to be later described. For bringing gear 71 in operative relation with any of the gears 74 to 78, there is provided a longitudinally and radially adjustable gear 80 rotatably supported on a wrist pin 81 secured on a crank 82 which is secured on a shaft 83 mounted in a bearing in the inner vertical wall of the casing 6 and extends through the outer vertical wall of casing 6, where the same is provided with a handle or knob 84 (see Figs. 5 and 6). By grasping the handle 84, the gear 80 can be raised or lowered and shifted longitudinally to effect any desired rate of wrapper feed desired to secure different sized wrappers. The feed rolls feed the paper down through the chute past the discharge opening 34, and when a sufficient length has been thus fed, it is sheared off at the proper time. For this purpose a shears has been provided which consists of a stationary shear plate 85, and a movable shear plate 86 (see Figs. 4 and 20). The stationary shear plate is supported on an adjustable casting 87 or the like upon one side of a rod 88 which depends from the casting 38. A clamping block 90 is positioned upon the opposite side of the rod and secured to the casting 87 (Figs. 5 and 20). A screw 89 extending from the casting 38 into the casting 87 may adjust the latter. The lower edge of the stationary shear plate is provided with a cutting edge to cooperate with the cutting edge of the movable shear plate 86 which is pivoted upon the under surface of the block or casting 87 and is periodically operated by the link 91 pivoted by means of a gimbal joint or the like to the inner end thereof. By reference to Fig. 4, it will be noted that the paper chute plate 54 is shortened so that the stationary shear plate will fit thereunder, while the plate 53 is deflected or bent inwardly to direct the paper against the stationary shears. The operating mechanism is so timed that the shears complete the shearing of the paper, as it comes in contact with the candy discharged from the mould. If there is no candy discharged to catch the paper, it falls out of the way. So the paper is always smooth when the candy strikes it and will not jam in the machine. The link 91 extends to the opposite side of the machine, where it is connected to a crank 92 (Fig. 4) intermittently driven from the main drive, as will be more fully hereinafter explained.

Wrapping mechanism.

At the time when the ejector 35 ejects a piece of candy through the discharge opening 34, it will pick up the wrapper that has been fed in front of the candy, as above explained, and shown in Figure 25, and push the combined wrapper and candy into a pocket 93 of a wrapping wheel 94 which is periodically operated and always brought to rest with one of its two pockets in alinement with the discharge opening 34 and the other pocket in alinement with a discharge box 95. The pockets in the wrapping wheel are diametrically opposite each other, and a separate ejector 96 is slidingly mounted in the wheel adjacent each pocket (Figs. 4 and 16), the forward end of each ejector being provided with a head 97 for contacting the candy, while the rear ends are provided with operating heads 98 that slide in guide grooves 94ª in the web of the wheel (Figs. 3 and 18, the operating heads 98 projecting sufficiently outward in order that they may be contacted by a pin or abutment 99 carried by the aforementioned oscillating crank 40, when in position to discharge a wrapped candy from a pocket 93. As shown in Figure 16, each ejector is yieldingly mounted in a slidable bushing 100 having an enlarged bore entering from one end, and terminating short of the other end to provide an annular shoulder, the outer half of the ejector rod being reduced in diameter to provide an annular shoulder, a coil spring 101 being confined between these shoulders, and as the bushing 100 is shorter than the distance between the heads of the ejector, the ejector will move relatively to the bushing. This construction permits the ejector head 97 to move a distance outwardly beyond the end of the bushing and beyond the pocket when discharging a wrapped candy, and as soon as the pin 99 is being withdrawn from operative engagement with an ejector head 98, the spring 101 will quickly snap or withdraw the head 97 from the discharged and wrapped candy, until the said head strikes the outer end of the bushing. This construction allows the final folders to operate and prevents the ejector head 97 from sweeping past the ejected and wrapped candy when the wrapping wheel rotates, and ejects the candy sufficiently beyond the wheel so that it cannot come in contact therewith. Each pocket is lined with spring plate members 102 anchored below the outer corners of the pockets and inclined inwardly with the upper ends bent into hook form over the circumference of the wheel and fitting in wide notches 103 so that the plates may have some play and serve to press the wrapper upon the candy. As the ejector 35 discharges a combined wrapper and candy into a pocket, it will slide the bushing 100 and the head 97 inwardly a distance equal to the thickness of the candy being wrapped. It is contemplated that any thickness of candy may be wrapped from approximately one-fourth to three-fourths inches in thickness; the sheared wrapper 104, as shown in Figure 25, will then be wrapped around the bottom and sides of a block of candy as shown in Figure 26.

While the wrapping wheel 94 is still in charging position, the first top fold will be made by a folder 105 which is in the form of a plate secured to a rock shaft 106 carried by a lever 107 pivoted to the back of the casing 6 and periodically oscillated by means of a yielding pitman 108 connected to said lever 107 intermediate its ends, the lower end of the pitman being slidably mounted in a bearing 109 carried by a crank 110 which is connected to a shaft 111 intermittently operated from the main drive, as will be more fully hereinafter explained. The lower end of the pitman is provided with a nut to bear against the bearing 109 so that upon the upward movement of the crank 110 the total thrust will be transmitted through the spring 109, while upon the downward stroke the thrust will be transmitted to the nut, as is obvious. It is desirable that the folder 105 be yieldable in directions to and from the wheel and for this purpose the rock shaft 106 is provided with a crank arm 112 having a short rod 113 attached thereto which slides through a bearing aperture in a lug 114 projecting from the lever 107, being constrained from movement in an upward direction by means of the nut 115, but being yieldable in a downward direction through the yielding feature of the spring 116. This construction allows the folder 105 to yield as it functions. It will be obvious that as the shaft 111 is oscillated to raise the folder 105 connected thereto, the front end of the folder will engage the wrapper at $104^a$ and fold the same over the top of the block or cube of candy, as shown in Figure 27.

As soon as the first top fold has been completed, the wheel 94 will rotate in a counter-clockwise direction and the unfolded top portion $104^b$ of the wrapper will come under the second top folder 117 which is in the form of a curved gravity shoe fitting and resting upon the upper circumference of the wrapping wheel, being yieldably secured by a link 118 (Fig. 4) pivoted to the casting 38 and yieldingly held by a spring 119 (see Fig. 11), the folder 117 thus making the second top fold shown in Figure 28.

When the wrapping wheel 94 has advanced from the charging position a distance equal to approximately 90° or a quarter of a revolution, it will stop momentarily with a pocket directly under the end tucker mechanism which consists of a pair of parallel tucking elements 120 (see Figs. 4 and 15) in the form of resilient plates secured at their upper ends to a block 121 having a portion fitting in a guide groove $55^a$ in the bracket 55, said block 121 being pivoted to a short link 122 which in turn is connected to an operating crank 123 which is secured to and oscillated by a shaft 124 driven from the main shaft, as hereinafter more fully described. The tucking elements 120 are so spaced by the block 121 that they glide down on each side of the shoe 117 and wheel when periodically operated in timed relation to the operation of the machine, and tuck the top extending portions $104^c$ and $104^d$ downwardly, as shown in Figure 29.

As soon as the tucking mechanism has completed its work, it returns to inoperative position and the first end folders 125 (see Fig. 4) come into action. These first end folders 125 are in the form of fingers which rotate and which are mounted and clamped upon short stub shafts $125^a$ which project from the downwardly extending wings 126 (see Figs. 3, 10 and 11) of the casing 38, which wings 126 pass in spaced relation on each side of the upper portion of the wrapping wheel, as clearly shown in Figures 3 and 4. These first end folders are mounted upon the ends of the stub shafts, which are sufficiently spaced apart to allow the wheel to rotate therebetween. In order to rotate the stub shafts, they are extended through the wings 126, where they are provided with spur gears 127, one spur gear 127 meshing with the aforementioned gear 79 and being rotated thereby, while the other spur gear 127 meshes with a similar gear 128 which in turn meshes with a similar gear 129 (Fig. 11) secured to a rod 130 rotatably supported in bearings in the walls of the casting 38. The opposite end of rod 130 is provided with a similar spur gear 131 which meshes with the aforementioned gear 79. As the gears 127, 128, 129 and 131 are all similar and of the same diameter, it will be obvious that rotation of the gear 79 will simultaneously rotate both stub shafts and the first end folders 125 thereon. From the position shown in Figure 4, the end folders 125 rotate in a counter-clockwise direction and effect the rear end folds $104^e$ and $104^f$, as illustrated in Figure 30.

As soon as the first end folds have been made, the wrapping wheel rotates again through an arc of 90°, during which movement the second end folders 132 (see Figs. 3, 4 and 14) come into action. These second end folders are in the form of arcuate shoe members which are pivoted upon the lower part of the paper reel standard 42, as shown in Figures 3 and 4, and are operatively and yieldably held in contact with the upper sides of the wrapping wheel by means of a coil spring 133, which connects the two folders below their pivot points and tends to draw them together against the sides of the wheel. The front edges of these folders are preferably bevelled so that the second end folds can more readily pass thereunder. This second end fold is effected while the wrapping wheel is in motion, the end folds 104$^g$ and 104$^h$ passing under the folders 132 and being folded upon and over the first end folds, as illustrated in Fig. 31.

After traveling through said arc of 90°, the wrapping wheel comes to rest in discharging position with the caramel pocket in alinement with the discharge box 95. At this point the crank 40 will be oscillated in a counter-clockwise direction, the pin 99 striking the head 98 of the ejector and ejecting the partially wrapped caramel into the discharge box 95, as shown in Figure 18. After the caramel has been ejected, the crank 40 will oscillate sufficiently in a clockwise direction, allowing the spring 101 to snap the ejector into the position shown in Figure 16, where it will not interfere with the final folders 134 (see Figs. 18 and 19) which are pivoted upon the lower end of the paper reel standard and are provided with intermeshing gear segments 135 and 136 at their pivoted ends whereby the folders are constrained to operate simultaneously. In order to operate the folders, the gear segment 136 is provided with an operating arm 137 having a pitman 138 pivoted thereto, the pitman slidably passing through a block 139 on the crank 140 secured to the shaft 159 projecting from the hollow bearing 141, the shaft extending within the casing 6 where it is periodically driven from the main shaft, as will be later set forth. The pitman 138 extends some distance below the crank block 139, having an adjustable nut on its end for confining a coil spring 142 against the block 139. This construction produces a yieldable pitman for operating the last folders, as is obvious, and the tension of the spring may be adjusted at any time. When the wrapped caramel is being ejected the folders 134 are widely separated and do not interfere with the discharge of the caramel, but directly after the discharge of the caramel, the said folders are operated so as to close or come together whereby they engage the lower side tucks 104$^i$ and fold them against the bottom of the wrapped block of candy, as shown in Figure 32, thereby firmly binding the end folds against the candy. If desirable, one end folder may be set slightly in advance of the other to prevent jamming of the points of the V-shaped tucks 104$^i$ and for obtaining a good overlap.

*Discharge box.*

While the final folders are operating to make the final folds as above described, the wrapped candy is held in the discharge box 95 (see Figs. 3, 4 and 18). This box comprises a four-sided structure having a passage therethrough to receive the wrapped candy, the passage being lined on the top and sides with resilient plates 143 pivoted or hinged to blocks 143$^a$ fastened on the outer ends of the sides and top and bent or deflected inwardly at their inner ends, coil springs 144 being positioned in sockets formed in the walls of the box to yieldingly bear against the spring plates to slightly force the inner ends inwardly so that the wrapped candy will be securely held while the final folds are being made. If desirable, the spring sockets may extend through the box walls and be closed by adjustable screws 144$^a$ for varying the tension of the spring, and the bottom of the box is provided with a smooth base plate 145. The discharge box is supported upon a bracket 146 mounted upon a projecting stud 147 extending from the rear of the casing 6. Only a portion of the length of the box rests upon the bracket 146; the remainder of the length of the box projects downwardly forming a shoulder which bears against the outer side of the bracket 146, and a rod 148 is secured in the bracket and freely passes through an aperture in the shoulder of the box and projecting some distance therebeyond. The outer end of the rod is provided with nuts or the like for confining a coil spring 149 on the rod against the shoulder of the box, and an operating handle 150 is secured to the lower side of the shoulder whereby the discharge box may be slid outwardly on the rod against the tension of the spring. The discharge box is hence yieldingly mounted for lateral movement and will give if necessary under the action of the ejectors 96. The bottom of the box projects outwardly to form a ledge 151 which has a groove or recess in alinement with a vertical plane through the center of the discharge box for receiving a corresponding lug on the bottom of a discharge chute 152, a small rod 153 passing through the ledge and lug to hold the chute in proper relation with the discharge box.

*Driving mechanism.*

The different mechanisms heretofore described are all intermittently operated in timed relation by the main drive, as will now be described.

In referring to Figure 7, which shows the assembly of the driving mechanism enclosed in the casing 6, by means of a cover 6ª, it will be observed that the shaft 154 is the main drive. This shaft extends beyond the front wall of the casing where it is supplied with an operating pulley 156 and a loose pulley 155 and is journaled in bearings supported by the walls of the casing 6. The pulley may be rotated by a belt 155ª connected to a motor 155ᵇ (see Fig. 1) secured to a bracket near the bottom of the machine frame, and a belt shifter 155ᶜ extending through the machine frame may be used to shift the belts. A small spur gear 157 is secured to the main drive shaft 154 and meshes with a large gear 158 secured upon the aforementioned shaft 22 which operates the presser feet in the forming box, the shaft 22 being supported in bearings 160 and 161 (see Fig. 13) in the casing 6. The gear wheel 158 is provided with cam grooves 158ª and 158ᵇ in each face. The near side cam groove 158ª (Fig. 7) operates a bell crank lever 162 secured to a shaft 163 which extends through the casing 6 and carries the rock lever 40 which operates the ejectors and knife wipers. The other end of the bell crank lever is connected by means of a rod 164 and a crank 165 to a shaft 159 which extends through the casing 6 and the bearing 141 projecting from the rear thereof (see Figs. 3 and 19) and has attached thereon the aforementioned crank 92 which in reality comprises a double crank or two cranks, one of which designated 140 operates the final folders and the other, designated 92, operates the paper shears.

The cam groove 158ᵇ in the far side of the gear 158 is best shown in Figures 8 and 13. The same operates a rock lever 167 which is secured to the aforementioned shaft 111 which operates the first top folder mechanism (see Figs. 3 and 4).

Mounted in the casing 6 above the gear 158 is a Geneva gear driver 168 which is mounted upon a shaft 168ª supported in the rear wall of the casing 6 and has secured thereon a spur gear 169 meshing with the gear 158. This Geneva gear driver operates a Geneva gear 170 which is constructed for intermittent arciform movement of 90° for each operation of the driver, being provided with four radial grooves 90° apart for this purpose in which the roller on the driver operates. The Geneva gear 170 is mounted on a shaft 171 which extends through a long bearing 172 projecting from the rear of the casing 6 and supports the aforedescribed wrapping wheel 94 (see Fig. 18).

On the shaft 22 adjacent the front wall, there is secured a second Geneva gear driver 173 which operates a Geneva gear 174 secured to a shaft 175 supported in the walls of casing 6. This Geneva gear 174 is provided with four radial grooves 90° apart and is hence operated through an arc of 90° for each operation of the driver. A spur gear 176 is secured upon the shaft 175 and meshes with a gear 177 supported by the rear wall of the casing. The gear 177 meshes with the aforementioned paper feeding gear 73 that is mounted on the shaft 72 of the paper feeding mechanism. The gear 73 is relatively small and provided with a wrist pin 178, to which is pivoted one end of a pitman 179, the other end of the pitman being slidably and yieldingly mounted in a bearing on a crank 180, a nut on the outer end of the pitman bearing against one side of the crank bearing and a coil spring 181 bearing against the inner side of the crank bearing. The crank 180 is secured to the aforementioned shaft 124 that operates the top tuckers (Figs. 3 and 4).

A small spur gear 182 (Figs. 5 and 7) is secured to shaft 175 on the far side of gear 176, with which it may be integral, and meshes with a spur gear 183 secured on the aforementioned forming mechanism drive shaft 9, as clearly shown in Figure 5, to rotate the cutter and forming box.

The operation is as follows:

The shaft 154 may be driven by any suitable source of power to impart its motion to shaft 22 through the gears 157 and 158. Shaft 22 is constantly rotating and hence the presser feet 13 and 14, which are operated by shaft 22, will be constantly operating for the purpose of pressing the candy dough between the cutting blades 10 of the forming box for moulding the same, and the presser foot 14 cutting the blocks or cubes of candy as it successively comes into substantial contact with each blade 10, as previously explained. The construction is such that the presser feet make complete oscillations forward and backward during the rest periods of the forming and cutter box 3, the presser feet being substantially at the limits of their inoperative strokes when the forming box or disk 3 is rotated. The forming box 3 is periodically rotated through a space equal to the distance between two blades 10; the ratio of driving gears for operating the forming box is such that the forming box 3 is rotated the proper distance during each 90° movement of the Geneva gear 174.

Assuming now that the parts are in the position shown in the drawing, the wrapping wheel having one pocket in alinement with the discharge opening in the forming box and the other pocket in alinement with the discharge box, and a cut block or piece of candy being in the mould or, in other words, between the blades 10 in front of the discharge or feed opening 34, and the driving shaft 154 is rotated in a counterclockwise direction, the first operation will be produced by the near side cam groove in gear 158 which operates bell crank lever 162 and shaft 163 upon which the bell crank lever is secured. The said cam groove will first operate shaft 163 in a clockwise direction, swinging rod 164 and crank 165 (see Fig. 7) downwardly. As crank 165 swings downwardly, it rotates shaft 159 to which the paper shears and the final folder jaws are connected, opening or separating the said folder jaws and operating the shears 86 for cutting off a proper wrapper, and rotation of the shaft 163 in said clockwise direction will oscillate crank 40 in the same direction to simultaneously operate the two ejectors for charging a piece of candy and its wrapper into the pocket of the wrapping wheel and discharging one from the wheel into the discharge box 95, assuming that a candy has just been wrapped in a previous operation, and at the same time reciprocating the cutter blade wiping mechanism into a position where the wiping elements 27 engage the knife edges of the blades 10, as shown in Fig. 23. Further movement of the cam gear 158 in the same direction will operate bell crank cam lever 162 and shaft 163 in a reverse direction. This reverse movement will simultaneously move the paper shears to the inoperative position shown in the drawing, reciprocate the wiping elements to cleanse a blade 10, move the charging ejector back to its inoperative position and closing the jaw folders 134, the spring 101 snapping or withdrawing the discharging ejector inwardly until its head 97 rests upon the bushing 100 so as not to interfere with the folder jaws as soon as the pin 99 releases the ejector. During this reverse movement of bell crank lever 162, the cam groove on the far side of cam gear 158 will be brought into position to oscillate rock lever 167 for oscillating shaft 111 to operate the first top folder 105 for applying the first top fold.

This anti-clockwise rotation of cam gear 158 caused by the above operations will bring the first Geneva gear driver 168 into position for turning the Geneva gear 170 and will bring the roller on cam lever 162 into the dwell portion of the cam groove. Rotation of Geneva gear 170 will rotate the wrapping wheel 94 a quarter revolution, 90°, which is mounted on the same shaft 171 as supports the said Geneva gear. As the wrapping wheel is thus rotated, the second top fold will be made by the folder shoe 117, the wheel coming to rest with the pocket directly under the tucker elements 120. Further movement of cam gear 158 will now bring the second Geneva gear driver 173 into position to rotate the Geneva gear 174 for a quarter revolution while the first Geneva gear is locked from rotating by the driver. Rotation of Geneva gear 174 will rotate gears 176 and 182, which simultaneously operate gear 183 for rotating the forming box 3, and gear 177 which in turn operates the paper feeding gear 73 which in turn oscillates the top tucker shaft 124 through the yieldable pitman 179. The operation of gear 183 will bring a fresh piece of candy in front of the discharge opening 34, and the rotation of gear 73 will operate the paper rolls 56 and 57 through the gears 74, 75, 76, 77 or 78, 80, 71, 69 and 62, as before explained, to feed the paper in front of the discharge opening 34. The rotation of gear 73 will also rotate the end folders 125 through the gears 79, 127, 131, 129 and 128. The oscillation of shaft 124 will move the tucker elements 120 downwardly to apply the upper end tucks 104$^c$ and 104$^d$. The gear 73 is rotated one complete revolution during each operation, so it withdraws the tucking elements 120 during the last 180° of its rotation, and it withdraws the same before the end folders 125 complete their revolution and strike the rear ends of the wrapper so no interference can occur during the operation of the said end folders. The cam gear 158 has also rotated sufficiently to bring the first top folder mechanism into stationary position.

When the cam gear 158 has operated the second Geneva gear 174 a quarter of a revolution, it will become locked by the locking portion of the driver and the first Geneva gear driver 168 will then be substantially in position to again rotate the Geneva gear 170. Further movement of cam gear 158 will then rotate Geneva gear 170 another quarter turn and rotate the wrapping wheel likewise to bring the pockets into alinement with the discharge opening 34 and the discharge box 95. During this movement of the wrapping wheel, the second end folds will be made by the second end folders 132, as previously explained. This last movement of the cam gear 158 will bring the parts back into the position shown in the drawings, and further movement of the cam gear 158 will operate the bell crank cam lever 162 as previously explained to operate the shears, eject a fresh piece of candy from the forming box into the wrapping wheel, eject the wrapped candy from the wrapping wheel, operate the cutter wipers, and separate the final folders which come together and fold the bottom tucks against the bottom surface of wrapped candy, as shown and previously explained.

It should be noted that after the bell crank cam lever 162 has completed its operation, it comes to rest with its cam roller in the dwell of the cam groove, and at this time the circular portion 168ª of the first Geneva gear driver 168 has passed out of contact with the arcuate locking portions 170ª of the first Geneva gear 170 allowing the same to be rotated by the arm of the driver. After a quarter turn of the said first Geneva gear, it becomes locked again by the circular portion of the driver, the circular locking portion 173ª of the second Geneva gear driver then passes out of contact with the arcuate locking depression of the second Geneva gear 174 allowing the same to be operated a quarter of a revolution. After a quarter turn, it becomes locked again, as is obvious, and the first Geneva gear becomes unlocked and is operated. A second quarter turn of the first Geneva gear will bring the cam gear 158 into a position to again operate the bell crank cam lever 162, while the two Geneva gears are locked. It is therefore evident that the driving mechanism operates in timed relation and that while one part or parts are operating, the others are securely locked or rendered inoperative from movement.

From the foregoing, it will be obvious that I have greatly simplified the construction and operation of candy wrapping machines by efficient and novel means, in which the final folds are made while the candy is held in a novel form of discharge box in which said folds are applied over the bottom of the block or cube of candy, in which a single device is utilized to charge a candy and wrapper into the wrapping wheel and discharge a wrapped candy therefrom in the same operation, in which a novel cleansing mechanism has been provided for the cutters of the forming box, in which an adjustable paper feed of novel construction is provided, and in which a simplified driving mechanism that intermittently operates the different parts in proper timed relation, and locking the parts from movement as soon as their operative movements are completed.

I am aware that numerous details of construction may be varied through a wide range without departing from the principles of this invention, and I therefore do not purpose limiting the patent granted otherwise than necessitated by the prior art.

I claim as my invention:

1. In a candy wrapping machine, the combination with a caramel wrapping wheel, of ejector mechanism therefor, a shaft for supporting said wheel, a Geneva gear on said shaft, a Geneva gear driver, a shaft for supporting said driver, a spur gear on said shaft, a cam gear meshing with said spur gear and having a cam groove, a cam lever operatively associated with said groove, means connecting said cam lever and ejecting mechanism, said cam gear operating said lever and Geneva gear driver in timed relation.

2. In a caramel wrapping machine, a casing having a vertical rear wall, a wrapping wheel, a shaft for supporting said wheel extending through said wall and into said casing, a Geneva gear on said shaft, a Geneva gear driver, a shaft for supporting said driver, a spur gear on said shaft, a cam gear meshing with said spur gear, ejector mechanism for said wrapping wheel, a cam lever mounted in said casing, a shaft secured to said lever and projecting through said vertical wall, means connecting said shaft and ejector mechanism, said cam gear operating said Geneva gear driver and cam lever in timed relation.

3. In a candy wrapping machine, an inclosed lubricant containing transmission casing, a casting secured to the rear wall of said casing, a pair of parallel wing plates on said casting, a wrapping wheel mounted on the rear wall of said casing and extending between said wing plates, rotatable end folders supported by said wing plates on each side of said wrapping wheel and means in said casting and casing for periodically operating said end folders.

4. In a caramel wrapping machine, an enclosed transmission casing, an auxiliary casing attached to the rear wall of said transmission casing, downwardly extending wing plates on said auxiliary casing, a wrapping wheel extending between said wing plates, end folders rotatably secured to said wing plates on each side of said wheel, paper feeding mechanism supported on said auxiliary casing and geared to said end folders, and means in said transmission casing for periodically operating said paper feeding mechanism.

5. In a caramel wrapping machine, a forming box having cutter blades, wiping mechanism therefor, a wrapping wheel, mechanism for simultaneously ejecting and injecting a caramel with respect thereto, an oscillatable element for simultaneously operating said mechanisms, and means for locking said wheel during the operation of said mechanism.

6. In a caramel wrapping machine, a rotary wrapping wheel, an arm pivoted adjacent thereto, a rock shaft carried by said arm, a folder on said shaft, said shaft having a crank, yielding means for operating said arm, said crank being yieldably connected to said means for the purpose set forth.

7. In a caramel wrapping machine, the combination with a wrapping wheel, of a folder adjacent said wheel, means for mounting said folder for sliding and outward movement with respect to said wheel comprising a pivot arm, a yieldable pitman connected to said arm and a one way yielding connection between said folder and pitman.

8. In a caramel wrapping machine, a pedestal having a lubricant chamber in its front face, a vertical cover for closing said chamber, a cam gear mounted in said chamber, and having a cam groove, a wrapping wheel supported in the rear of said pedestal and having a shaft extending into said chamber, a Geneva gear on said shaft, a Geneva gear driver comprising a gear in mesh with said cam gear, a second shaft extending from said chamber to the rear of said pedestal, a bell crank lever mounted upon said shaft, one arm of said lever operating in said cam groove, a third shaft extending from said chamber and connected to the second arm of said bell crank, said cam gear operating said second and third shafts and wrapper wheel in alternate timed relation for the purpose set forth.

9. In a caramel wrapping machine, a pedestal having a lubricant chamber in its front face, a cam gear supported in said casing, a wrapping wheel mounted on the rear of said pedestal and having a shaft extending adjacent said cam gear, a Geneva gear on said shaft, a Geneva gear driver therefor, a spur gear connected to said driver and in mesh with said cam gear, a Geneva gear driver mounted coaxially with said cam gear, a Geneva gear driven by the last mentioned driver, a paper feed geared to said second Geneva gear, said Geneva gears being alternately rotated by said cam gear.

10. In a caramel wrapping machine, an intermittently rotatable forming box, continuously operating presser feet therein, a wrapping wheel adjacent said forming box, a shaft for supporting said wrapping wheel, a Geneva gear on said shaft, a second shaft connected to said presser feet, a spur gear upon said second shaft, means for continuously rotating said gear, a Geneva gear driver for said Geneva gear operatively connected with said spur gear, a Geneva gear driver connected to said spur gear, a Geneva gear intermittently operated thereby and means connecting said forming box and second Geneva gear, said spur gear alternately operating said Geneva gears in timed relation.

11. In a caramel wrapping machine, a pedestal having a transmission and lubricant chamber in its front face, a wrapping wheel supported upon the rear of said pedestal and having a shaft extending into said chamber, a Geneva gear on said shaft within said chamber, a continuously rotatable cam gear in said chamber having cam grooves in its opposite faces, a Geneva gear driver operatively associated with said Geneva gear and driven by said cam gear, plungers for injecting and ejecting caramels with respect to said wheel, mechanism upon the rear of said pedestal for operating said plungers, a plunger shaft connected to said mechanism and extending into said chamber, a bell crank lever mounted upon said plunger shaft within said chamber, one arm of said lever engaging one of said grooves in said cam gear, a pair of final folders adjacent said wrapping wheel operatively connected to the other arm of said bell crank lever, and a top folder adjacent said wrapping wheel, a shaft for operating said top folder extending into said chamber, and lever mechanism operated by the other cam groove in said cam gear and connected to said last mentioned shaft.

In testimony whereof I have hereunto subscribed my name.

WALTER H. SERGENT.